May 27, 1941.  T. W. SUKUMLYN  2,243,362
ELECTRON MICROSCOPE SYSTEM
Filed Aug. 20, 1938  2 Sheets-Sheet 1

INVENTOR
Thomas W. Sukumlyn
BY John Flam
ATTORNEY

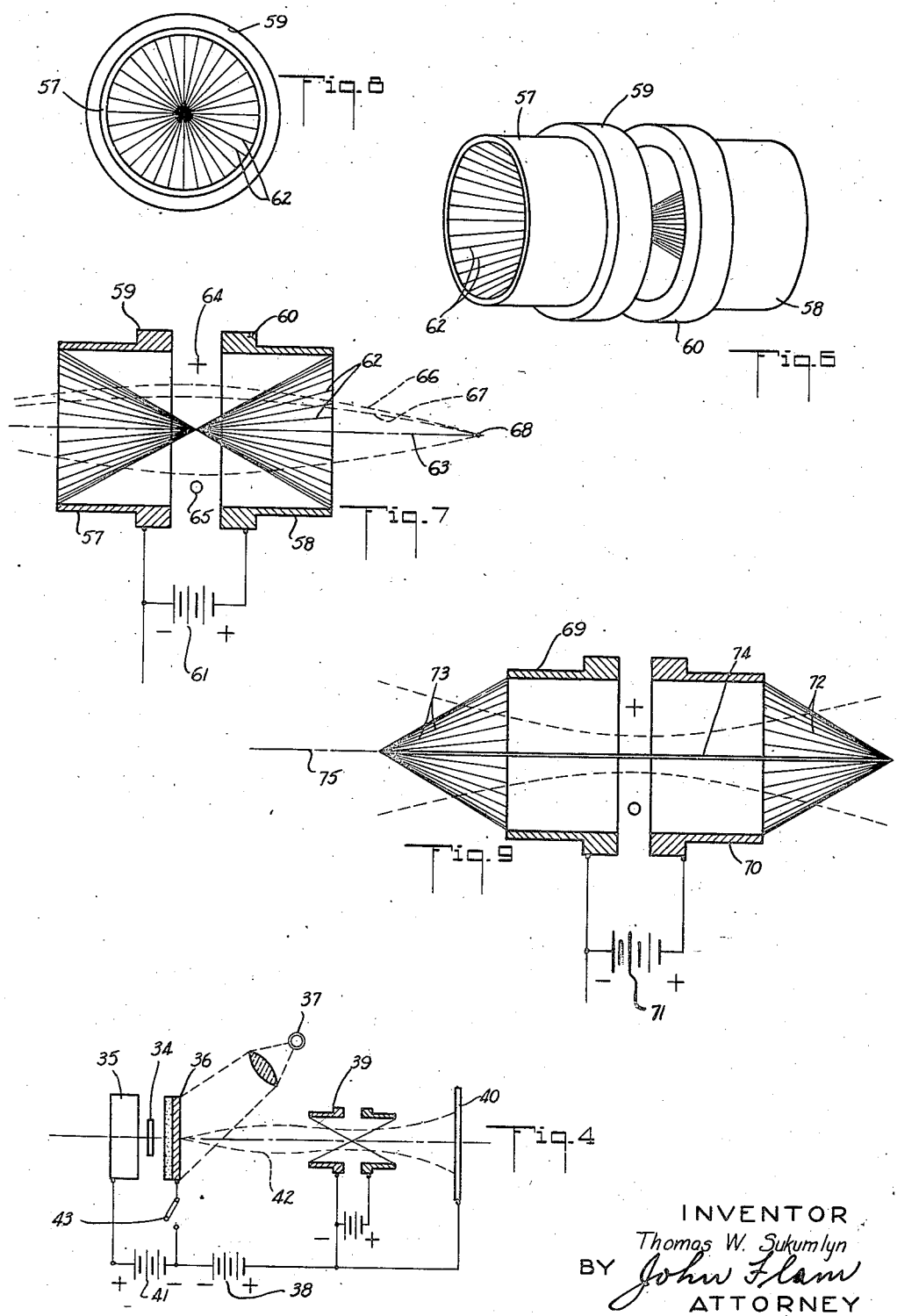

Patented May 27, 1941

2,243,362

UNITED STATES PATENT OFFICE 2,243,362

ELECTRON MICROSCOPE SYSTEM

Thomas W. Sukumlyn, Los Angeles, Calif.

Application August 20, 1938, Serial No. 225,953

5 Claims. (Cl. 250—49.5)

This invention relates to a system for magnifying images.

The basis of magnification of this character is the use of an optical lens system, for refracting light emanating from points of the object, in such a way as to focus diverging rays to build up an enlarged image. It is well-known, however, that it is not possible to magnify the image indefinitely. There are inherent limits to the degree of magnification by optics. One of the limiting factors is the wave length of the light utilized for the illumination. It may be proved, for example, that with visible light, two points on an object to be magnified can be no closer than .00001 inch in order to appear as separate points of the enlarged image. The shorter the wave length in general, the smaller may be this point separation and yet yield separate points on the enlarged image.

It is one of the objects of this invention to obviate these limitations, and particularly by the utilization of suitable radiant energy of other than visible light.

Radiant energy for this purpose may be that provided by electronic emission. A magnified image, corresponding to the object to be enlarged, may be formed by the electrons on a fluorescent screen; or alternatively the electrons may affect a sensitive photographic surface. The stream of electrons is controlled to delineate the image; and for this purpose use is made of devices intended to bend the electron rays in a manner analogous to the refraction of visible light by an optical system.

It is another object of this invention to provide devices of this character, which may be aptly termed electron ray lenses.

The simplest manner of practicing the invention is by rendering the object electron emissive, as by coating it with a photosensitive material and exposing it to actinic radiations. However, other ways of affecting electron beams to delineate the object may be substituted; for example by interposing the object in the path of such a beam. It is another object of this invention to make it possible to transmit a beam of electrons to affect a suitable screen and to form thereon an enlarged or magnified image of an object cooperating with the beam.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of my invention, will now be described in detail; but it is to be understood that this detailed description is not to be taken in a limiting sense, since the scope of my invention is best defined by the appended claims.

Referring to the drawings:

Figs. 2, 3, 4 and 5 are diagrams similar to Fig. 1, showing modified forms of the invention;

Fig. 6 is a pictorial view of one of the electron ray lenses that are used in the system;

Fig. 7 is a diagram illustrating the function of the electron ray lenses illustrated in Fig. 6, and also shows the lens in longitudinal section;

Fig. 8 is an end view of the electron ray lenses illustrated in Fig. 6, and

Fig. 9 is a view similar to Fig. 7 of a form of electron ray lens in which the electron ray diverges in passing through the lens instead of converging as in the form illustrated in Figs. 6, 7 and 8.

Figure 1:
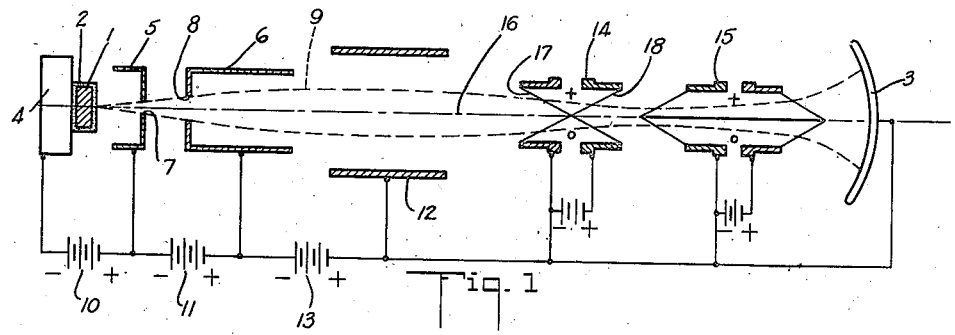
Fig. 1 is a diagram, illustrating an embodiment of my invention.

In the form of the invention illustrated in Fig. 1, a conventionally shaped object 1 is illustrated as the object of which it is desired to form an image by the aid of electronic emission. For this purpose this object 1 made be made inherently emissive in any suitable manner. For example, the object 1 may be coated on its front surface with a layer 2 of radio-active material. Such a coating may be obtained in any well known manner, such for example as exposing the object 1 to radio-active material or to radium emanation. Electrons are liberated from the coating 2 and finally the beam of electrons corresponding to the object 1 is focused to an image; in this instance, on a screen 3. This screen 3 may be fluorescent in order to produce immediately a visible image, or else a photo-sensitive layer may be provided to affect it actinically.

The forming or focusing of the image involves the use of refracting devices intervening between the object 1 and the screen 3. The object 1 is disposed in conducting relation to a conducting support 4. A pair of annuar or tubular devices 5 and 6 are next placed in the path of the electron stream. These devices 5 and 6 are provided with apertures 7 and 8 respectively for confining the electron beam 9' emanating from object 1 in a comparatively narrow path. For this purpose the members 5 and 6 are maintained at a potential positive with respect to the object 1 as by the aid of the batteries 10 and 11. These devices 5 and 6 may be termed electro-optical lenses for acting upon the electrons to confine them into a small bundle.

The electron beam 9 conforming to the object 1 is next acted upon by accelerating anode 12. This accelerating anode 12 is maintained at a positive potential with respect to object 1 by the aid of the additional battery 13.

Located with the path of the beam 9 as it emerges from the directing or accelerating anode 12 are a pair of electron ray lenses 14 and 15, forming a ray refracting system. These are substantially analogous to refracting optical lenses. Thus lens 14 is the equivalent of a convex or converging lens structure, while lens 15 is the equivalent of a concave or diverging lens structure for the beam 9. The specific structure of these two lenses will be described in connection with Figs. 6, 7, 8 and 9. For the moment it is merely sufficient to note that each of these lenses are in the form of a series of conductors arranged to provide magnetic fields through which the beam 9 must travel to reach screen 3. Thus lens 14 forms a magnetic field annularly disposed around the axis 16 of the lens. This annular field in this instance is shown as having increasing length as the radius increases from the axis 16. This is represented by the triangular section bounded by the crossing lines 17 and 18, the crossing occurring on the axis 16.

Accordingly, the rays comprising the electron beam 9 are deflected more and more as they depart from the axis 16. This deflection occurs due to the well-known action of a magnetic field upon electrons. In other words, this magnetic field serves in a manner analogous to a converging optical lens in its operation upon the electron beam 9.

Analogously, the electron ray lens 15 is arranged in reverse manner; that is, the length of the annular magnetic field is a maximum along the axis 16 and its length decreases as the radius increases from this axis. Thus the electron beam 9 is diverged by this lens structure 15.

By appropriate positioning and design of the lenses 14 and 15, they form a proper refracting system. The action upon the beam 9 is that the beam is focused to cause an image to be visible on the screen 3, either by fluorescence or by development of the photosensitive surface.

As illustrated, the screen 3 is maintained at a potential positive with respect to the object 1 in order that the electrons may be attracted thereon. Also, the structure 14 and 15 may be connected to the system so as to be maintained at a positive potential.

It will be understood that all of the apparatus in this as well as the other forms of the invention is to be inclosed in an appropriate, evacuated vessel.

Figure 2:
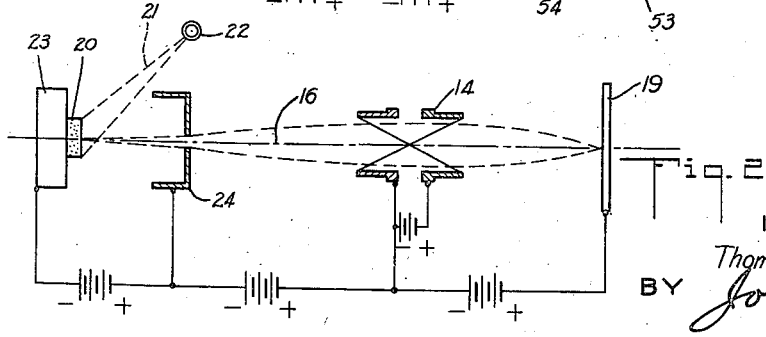

In the form of the invention illustrated in Fig. 2, the plate or screen 19 is shown as receiving electrons emitted from the object 20. This object 20 is shown in this instance as subjected to beta radiations 21 from a source 22, as radium. In this instance there is no need of any active coating being placed upon the object 20, so long as it is made of a material that emits electrons upon being bombarded by the beta rays. The support 23 upon which the object 20 is placed is purposely chosen of some material, such as carbon, which has low secondary emission. Preferably this carbon should be in the form of a diamond capable of taking a high polish and its purpose is to support the object in one plane.

As before the electrical lens 24 may be utilized to confine the electron beam emitted from the object 20 to a narrow form. The refracting system is illustrated in this instance by a single convex electron ray lens 14. The object is intended to be formed by the aid of the beam on the plate 19 either by fluorescence or by proper development of a photo-sensitive surface.

Other means for causing the object to emit electrons may be utilized. These means are obvious and need not be detailed in full. The object, for example, if possible to do so, may be heated to a sufficiently high temperature to cause the thermionic emission of electrons.

Figure 3:
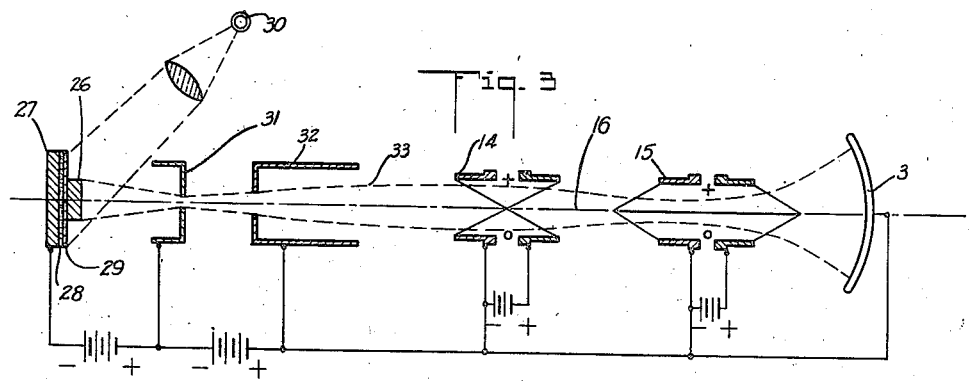

Instead of forming the beam of electrons by emission from the object, it is possible to obtain a similar effect by interposing the opaque object within a beam of electrons, obtaining thereby a negative image. Such an embodiment is illustrated in Fig. 3. In this form of the invention the object 26 is shown as mounted upon a structure 27. This structure may include a very thin photo-electric film 28 overlaid by a very thin protective layer 29 as of quartz or the like. A source of light 30 may be focused to illuminate the photoelectric layer 28 to cause it to emit electrons. The electrons are confined to a narrow beam 33 by the electric lenses, 31 and 32. Thereafter the beam is acted upon by the refracting system comprising the electron ray lens structures 14 and 15. The screen or plate 3, as in the form of Fig. 1, may be fluorescent or may carry a photosensitive layer.

In case the source 30 be rich in ultra violet light, of course the photoelectric effect might be obtained by the use of appropriate uncoated metal surfaces, such as a polished zinc surface. It is also evident that in case a photosensitive layer is provided upon the plate 3, the source 30 must emit light of such frequency as not to effect the photosensitive layer.

It is not essential to produce a beam of electrons conforming to the image by interposing the object in the beam or by propagating rays of electrons from the object. This same effect may be accomplished by altering the beam in other ways. For example, in the form of the invention illustrated in Fig. 4, the object 34 is shown as interposed in an intense electric field so as to affect the distribution of an electric charge on an electron emissive surface such as formed by a photoelectric layer. Thereby the electric emission quality of the photoelectric layer varies from place to place in accordance with the intensity of the charge at the place selected. Thus the object 34 which is assumed to be dielectric, and exterior of the tube enclosing the operating parts, may be suitably supported adjacent the plate 35. This object 34 disturbs the electric field between plate 35 and a membrane or layer 36. This disturbance causes a different charge to be effected at those parts adjacent to the object than is existent elsewhere. This occurs because the membrane 36 and its thin photo-electric deposit is of sufficient resistance such that its elemental areas may retain for a considerable time any local change in charge due to loss of the emitted electron. These electrons are emitted by virtue of illumination from a light source 37. Under the influence of the electric field produced by the battery 38, there is a beam of electrons that is refracted by the refracting system 39 on to the plate 40, upon which the refracting system focuses the image. By virtue of interposition of the object 34 in the electric field produced by the battery 41, this electron beam 42 is altered to conform in general to the object.

In order to obtain the equivalent of a time exposure should plate 40 carry a photosensitive layer, the source of light 37 may be first de-energized and a switch 43 may be closed until the membrane 36 is charged in accordance with the form of the object; then the source 37 may be energized. This procedure is repeated until a sufficient volume of electron emission is secured.

Figure 5:
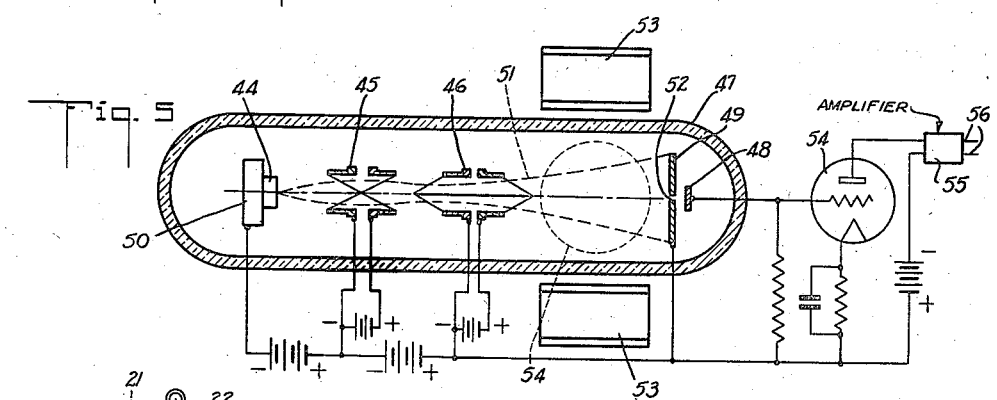

Instead of focusing the image by the refracting systems disclosed onto a plate, it is possible to provide a scanning system such as utilized in television. Such an embodiment is illustrated in Fig. 5 where the object 44, as well as the refracting system comprising lenses 45 and 46 are shown as enclosed in a vacuum tube 47. Enclosed in the same tube is a target 48 and an apertured plate 49. The apertured plate 49 forms an anode with respect to the plate 50 that supports the object 44. The object 44 is made electron emissive in any of the above mentioned manners. The electron beam 51 focused upon the plate 49 may be deflected as is commonly accomplished, to scan the plate 49 with respect to the aperture 52 therein; as for example by the aid of two sets of electro-magnetic coils 53 and 54 in a well understood manner. The electric charge received upon the target 48 may be utilized in a well known manner to effect the in-put circuit of the thermionic device 54. The out-put circuit is shown as affecting an amplifier system 55 having out-put leads 56 that are connected in any appropriate manner to a television receiver system.

The electron ray lenses are shown to best advantage in Figs. 6 to 9 inclusive. In the structure illustrated in Figs. 6, 7 and 8, the effect of the electron ray lenses is to converge rays of electrons. For this purpose use is made of a pair of terminal collars 57 and 58 placed coaxially with respect to a lens axis 59. Each of these terminal collars may carry enlarged flanges such as 59 and 60 connected to opposite poles of a battery 61 or other source of electrical energy. These flanges 59 and 60 insure that there be no appreciable variation in the resistance through the various conducting paths now to be described. These conducting paths are formed of conducting elements such as 62 forming virtually elements of a double cone, the bases of which are oppositely directed and the apex of which falls upon the axis 63. It is seen that current flows from battery 61 first of all to the terminal collar 58; thence from the base of one cone element through all of the conductors 62 in parallel, and finally to the base of the left hand cone into the terminal collar 57 to the negative side of the battery 61. The resultant magnetic field is such that in the annular area between the internal surfaces of collars 57, 58 and the equivalent cone surfaces, there is a strong magnetic field directed downwardly in the upper part of the figure as indicated by the cross 64, and upwardly as indicated by the dot 65. The magnetic field is confined to the space between cylinder and cone and is everywhere perpendicular to the axis.

Assuming that there are two electron rays 66 and 67 emerging from a common point on an object, these rays are bent downwardly and inwardly toward the axis to be focused at a common point 68. The ray 66 which is farther from the axis 63 than the ray 67 is refracted to a greater extent because it travels through a longer magnetic field.

A refracting lens structure for diverging the electron ray is illustrated in Fig. 9. In this case the terminal collars 69 and 70 are fed from a battery 71. The conductors 72 form virtually the elements of a cone, and are attached at the base of the cone to the outer edge of the terminal collar 70. A similar set of conductors 73 is arranged in connection with the terminal collar 69. The two sets of conductors 72 and 73 are connected by conductor 74. The axes of the cones coincide with the axis 75 of the lens structure.

In this case the annular magnetic field resulting from the current flowing through conductors 72 and 73 has a diminishing width. The section of the annulus is defined by the elements of the enveloping cones and by the internal surfaces of the collars 69 and 70. Accordingly the farther away an electron ray is from the axis 75, the shorter its path through the magnetic field. The resultant effect is to diverge the rays.

It is clear that by appropriate design and appropriate location of one or more electron ray lenses such as now described, the electron rays may be treated in substantially the same manner as light rays by optical refracting systems.

What is claimed is:

1. The process of producing an image of an object, comprising: forming an electric field, interposing the object in said field, developing a charge pattern on a photoelectric layer corresponding to the pattern of said object, illuminating substantially the entire area of said layer to cause electronic emission therefrom until the layer is substantially discharged, collecting the electrons on a photo sensitive surface, discontinuing the illumination until the layer is again charged, and repeating the procedure until the desired amount of electrons have been collected.

2. In a system for producing a magnified image of an object, a metallic member, a tenuous conductor, means for forming an electric field between opposed areas of the member and the conductor, said member and conductor being spaced to accommodate the object, said object when interposed in said field serving to alter the distribution of the static charge on said conductor, a thin layer of photoelectric substance on that side of the conductor that is faced away from the object, and means illuminating said substance to cause electrons to be emitted therefrom in accordance with the distribution of the charge on the conductor.

3. The process of producing an image of any chosen object incapable of effectively operating as a source of electrons, which comprises placing such an object in an electric field, to cause thereby the development of a non-optical stationary charge pattern corresponding to the pattern of the object, onto a surface of a conducting member, exposing said surface generally to radiations for releasing electrons therefrom in accordance with said charge pattern, and directing said released electrons in a direction away from said object.

4. In a system for producing an image of any chosen object incapable of effectively operating as a source of electrons, a pair of separated conductors, means for creating an electric field between the conductors, in which field said object may be placed to cause thereby the development of a stationary non-optical charge pattern corresponding to the pattern of the object, onto a surface of one of the conducting members, means for subjecting said surface to general radiation capable of releasing electrons from said surface, means for directing the released electrons in a direction away from said object, and a fluorescent screen for receiving said electrons.

5. In a system for producing an image of any chosen object incapable of effectively operating as a source of electrons, a pair of separated conductors, a photoelectric layer forming a surface on one of said conductors, means for creating an electric field between the conductors, in which field said object may be placed to cause thereby the development of a non-optical stationary charge pattern corresponding to the pattern of the object, onto said photoelectric layer, means for generally illuminating said surface to cause emission of electrons therefrom, means for directing the released electrons in a direction away from said object, and a fluorescent screen for receiving said electrons.

THOMAS W. SUKUMLYN.